Figure 7:
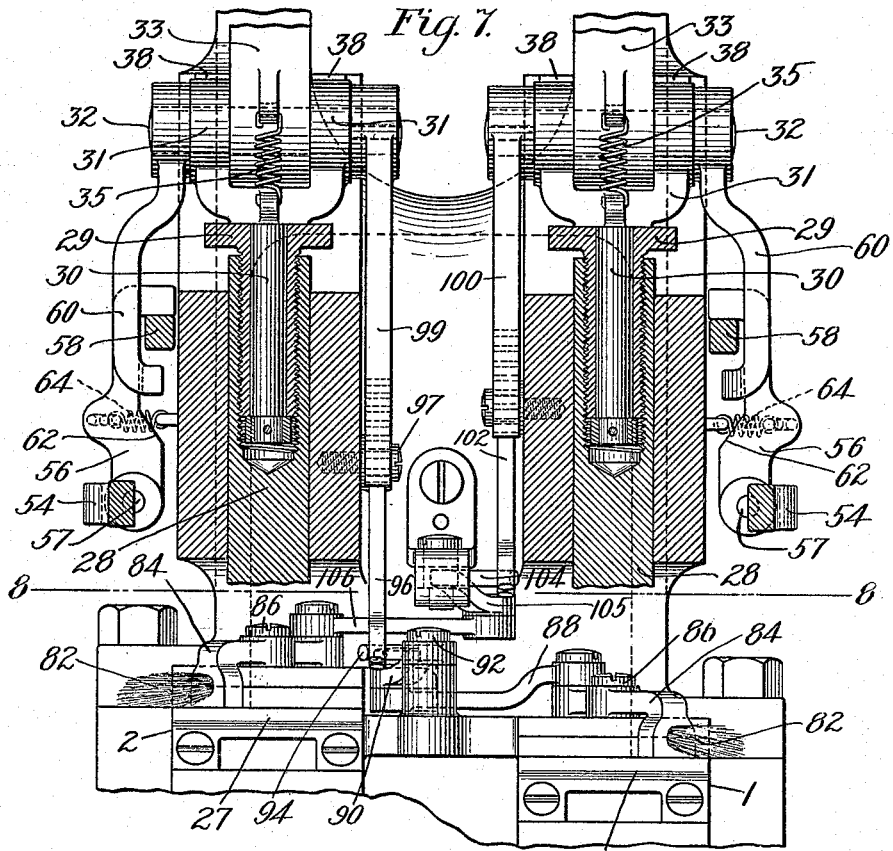

No. 885,099. PATENTED APR. 21, 1908.
G. F. STEWART.
WELT MARKING MACHINE.
APPLICATION FILED MAR. 12, 1907.
7 SHEETS—SHEET 1.
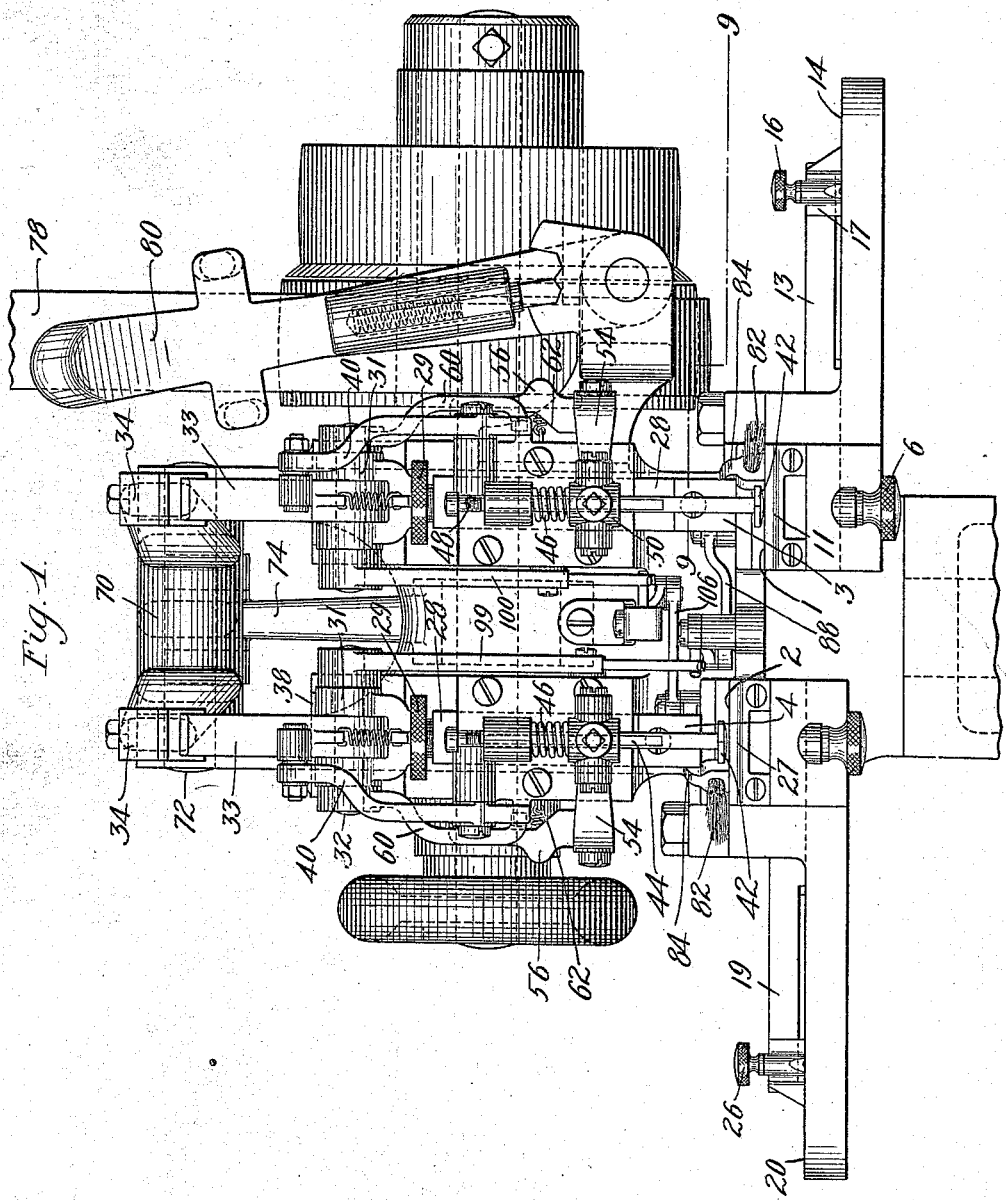
Witnesses.
Franklin E. Low
Robert H. Kammler
Inventor:
George F. Stewart
by Emery & Booth
Att'ys.

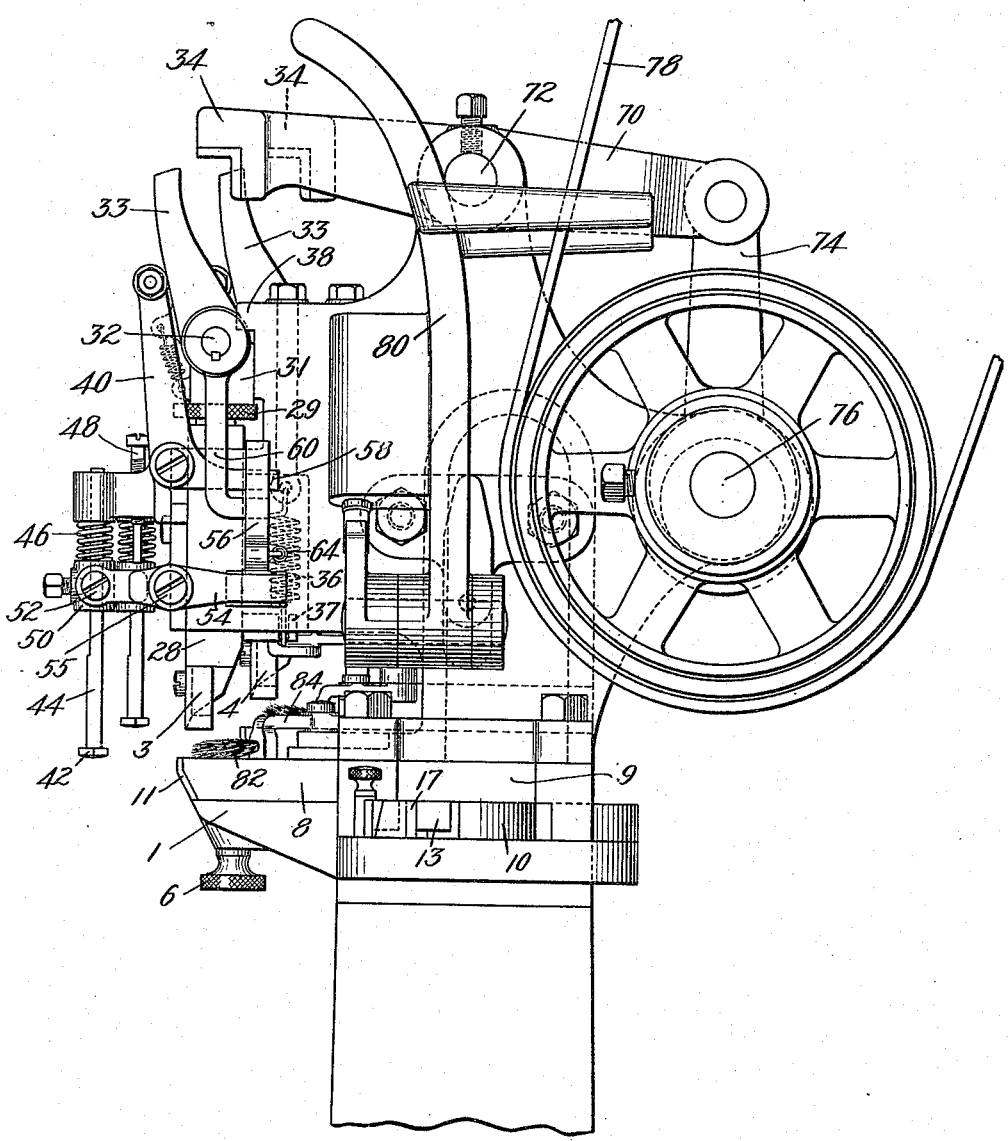

No. 885,099. PATENTED APR. 21, 1908.
G. F. STEWART.
WELT MARKING MACHINE.
APPLICATION FILED MAR. 12, 1907.
7 SHEETS—SHEET 3.
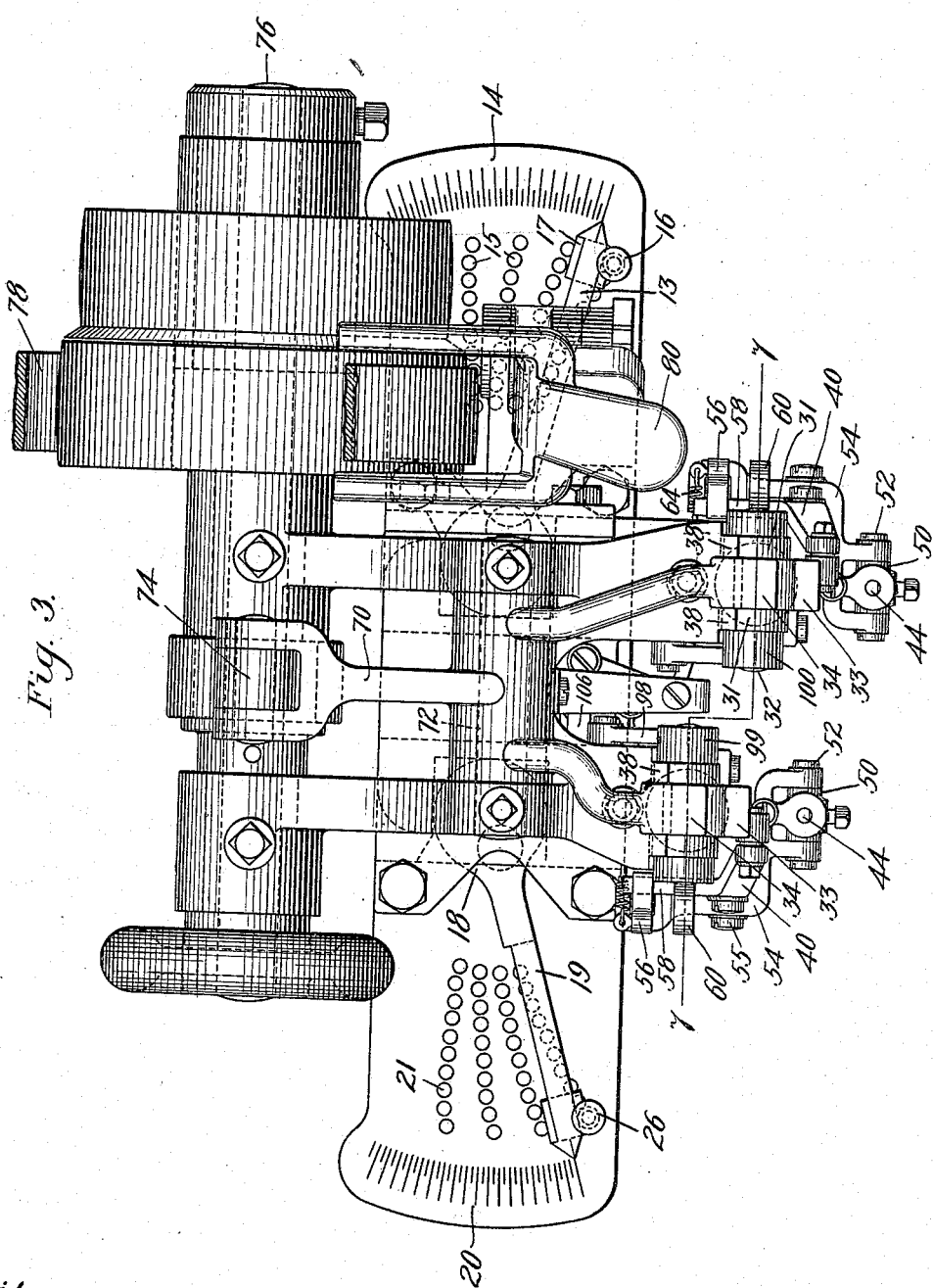

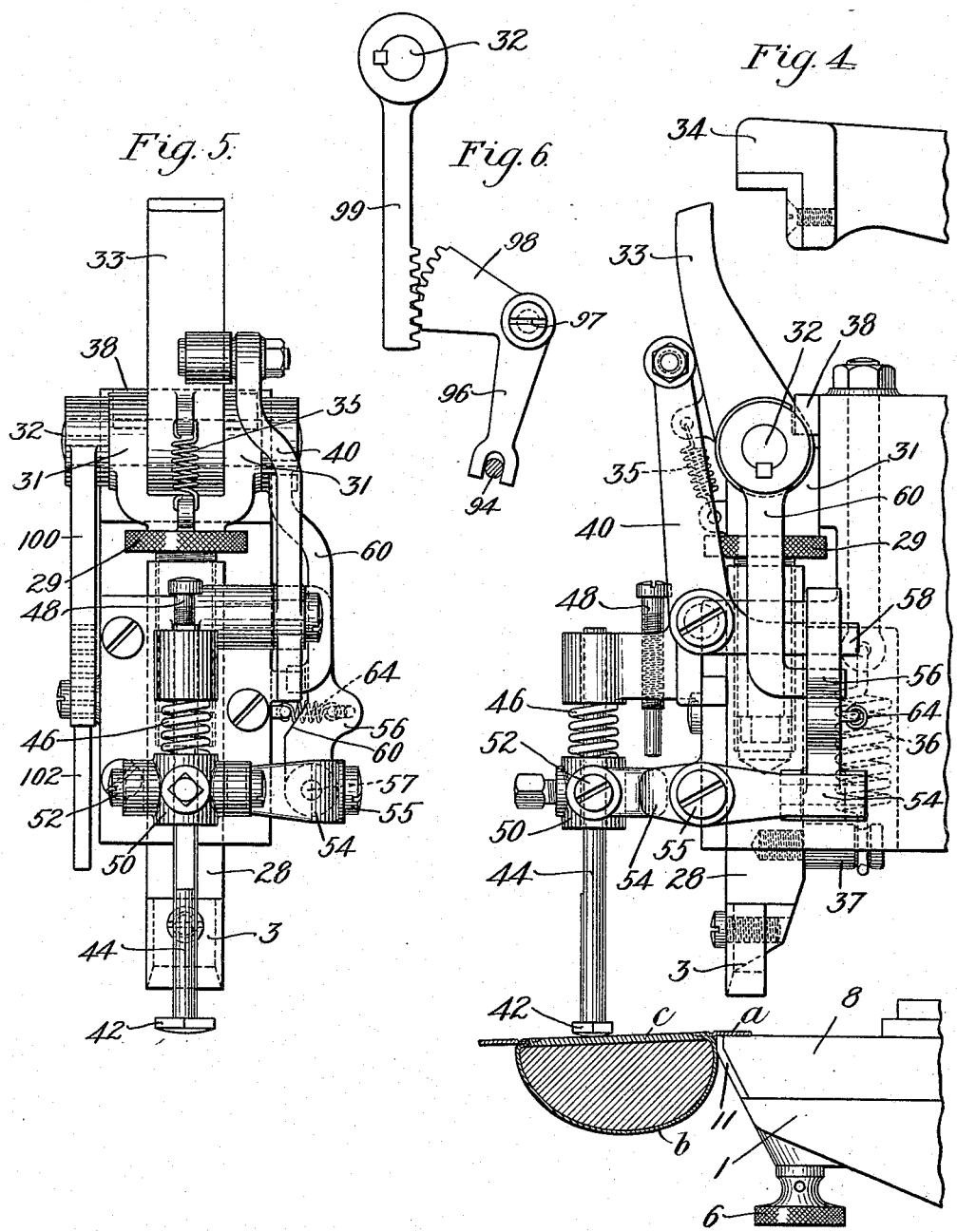

No. 885,099. PATENTED APR. 21, 1908.
G. F. STEWART.
WELT MARKING MACHINE.
APPLICATION FILED MAR. 12, 1907.

7 SHEETS—SHEET 5.

Witnesses:
Franklin E. Low
Robert H. Kammler

Inventor:
George F. Stewart.
by Emery & Booth
Att'ys.

No. 885,099. PATENTED APR. 21, 1908.
G. F. STEWART.
WELT MARKING MACHINE.
APPLICATION FILED MAR. 12, 1907.
7 SHEETS—SHEET 6.
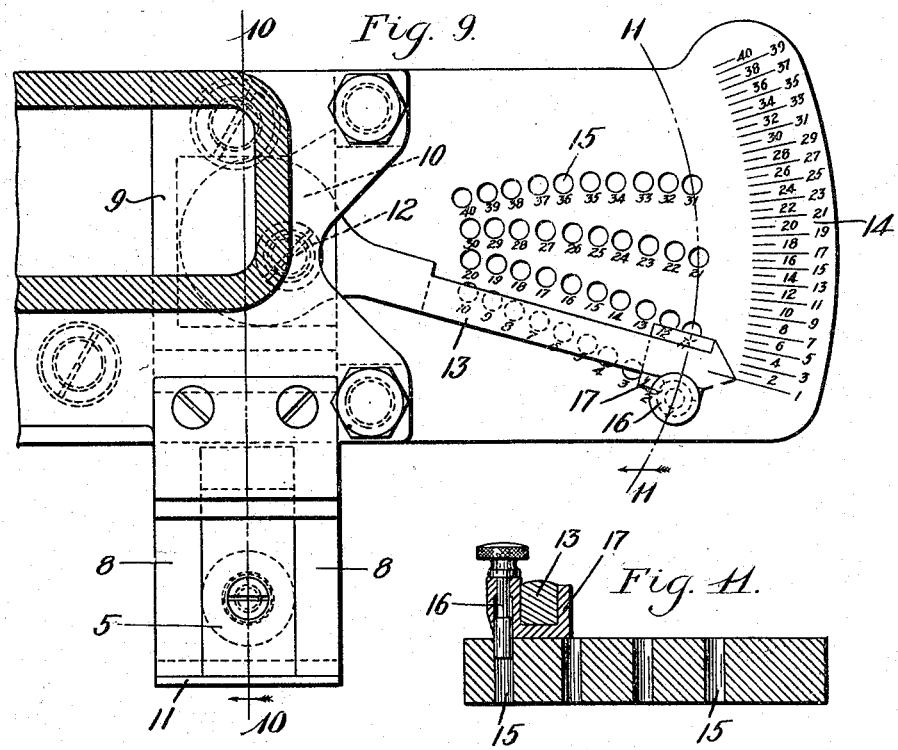
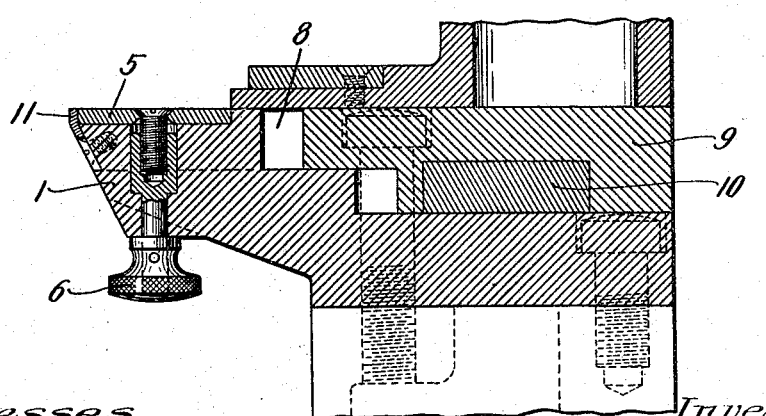
Witnesses.
Franklin E. Low
Robert H. Kamm
Inventor.
George F. Stewart
by Emery & Booth
Attys.

No. 885,099. PATENTED APR. 21, 1908.
G. F. STEWART.
WELT MARKING MACHINE.
APPLICATION FILED MAR. 12, 1907.

7 SHEETS—SHEET 7.

Witnesses.
Franklin E Low
Robert H Kammli

Inventor.
George F. Stewart.
by Emery & Booth
Att'ys

UNITED STATES PATENT OFFICE.

GEORGE F. STEWART, OF LYNN, MASSACHUSETTS, ASSIGNOR, BY MESNE ASSIGNMENTS, TO THOMAS G. PLANT, OF BOSTON, MASSACHUSETTS.

WELT-MARKING MACHINE.

No. 885,099.   Specification of Letters Patent.   Patented April 21, 1908.

Application filed March 12, 1907. Serial No. 361,926.

*To all whom it may concern:*

Be it known that I, GEORGE F. STEWART, a citizen of the United States, residing at Lynn, in the county of Essex, State of Massachusetts, have invented an Improvement in Welt-Marking Machines, of which the following description, in connection with the accompanying drawings, is a specification, like letters on the drawings representing like parts.

This invention is directed, in part, to the facilitation of adjustment of sole leather and uppers when they are initially assembled.

It has been customary to adjust sole leather and uppers by more or less inaccurate methods; but by employing an embodiment of this invention, some part associated with the upper may be given a definite demarcation to which the sole leather may be referred so as to admit of a ready and accurate adjustment. For purposes of illustration the invention will be described herein as employed in making on the welt of a welted upper a mark to which may be referred for adjustment the edge of a previously shaped sole blank.

While one of the objects of the invention relates to the adjustment of sole leather and uppers and the making of marks to facilitate such adjustment, it is to be understood that certain features of the invention described herein as contributing to the attainment of that object, are applicable also to various other and different uses, as will appear to those skilled in the arts. It will suffice, however, to describe a single mode of employing such features of the invention, leaving to be defined in the appended claims the proper field within which they may be employed without departing from the scope of the invention.

Figure 8:
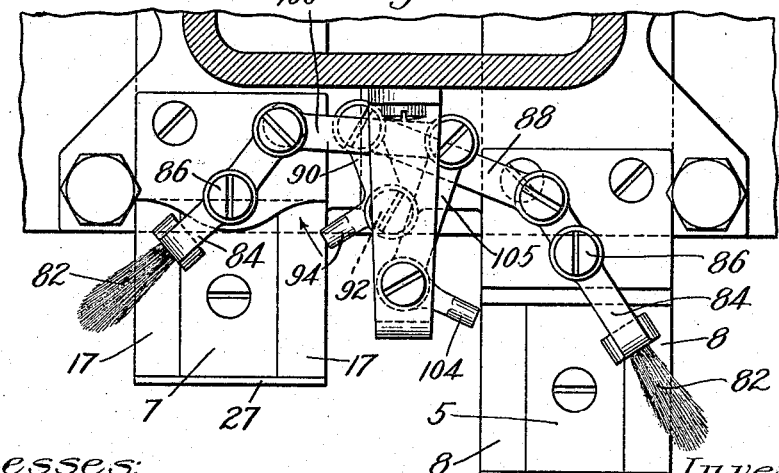
Figure 12:
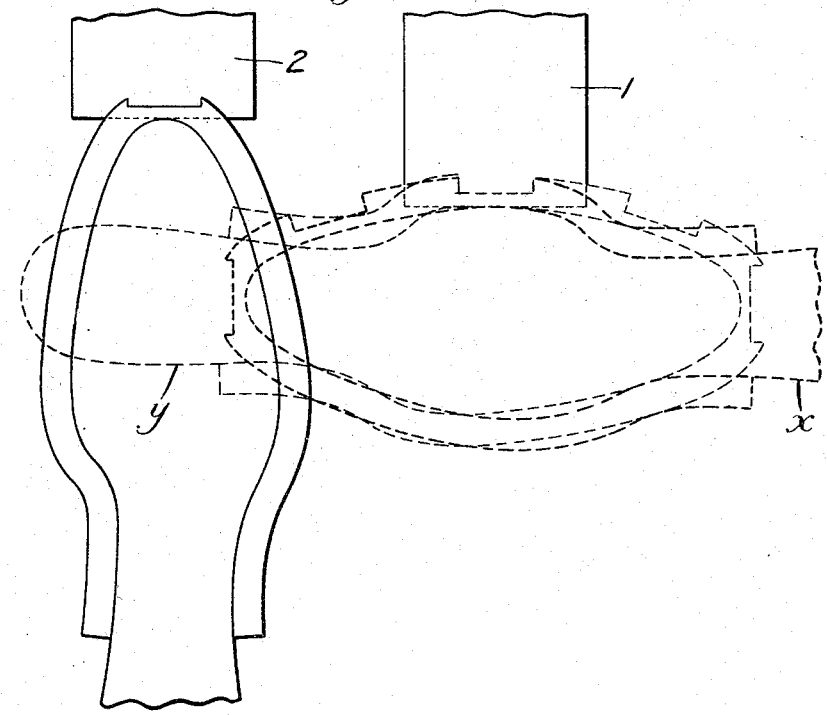
Figure 13:
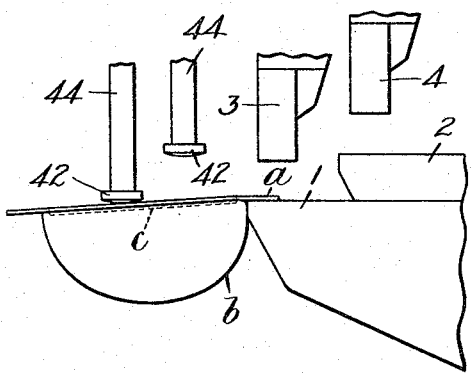
Figure 14:

In the accompanying drawings,—Figure 1 is a front elevation of a machine embodying this invention; Figs. 2 and 3 are respectively a side elevation and a plan of the machine shown in Fig. 1; Fig. 4 is an enlarged detail side elevation of certain parts shown in Fig. 2; Fig. 5 is a front elevation of certain of the parts shown in Fig. 4; Fig. 6 is a detail view hereinafter explained; Fig. 7 is a detail section on a substantially vertical plane indicated by the line 7—7 of Fig. 3; Fig. 8 is a detail section on a substantially horizontal plane indicated by the line 8—8 of Fig. 7; Fig. 9 is a detail section on substantially horizontal planes indicated by the line 9—9 of Fig. 1; Fig. 10 is a detail vertical section on the line 10—10 of Fig. 9; Fig. 11 is a detail vertical section on the line 11—11 of Fig. 9; Figs. 12 and 13 are diagrammatic views illustrating the manner of introducing uppers to the machine shown in the other figures; and, Fig. 14 is a detail horizontal section of a convenient form of knife which may be used as a marking device in connection with the machine shown in the other figures.

Referring to Figs. 1 and 2, the machine has two work supports 1 and 2 which are preferred to be used successively to sustain the work while it is being marked by the marking devices 3 and 4, respectively. In accordance with a convenient mode of operating the machine (illustrated diagrammatically in Figs. 12 and 13), the toe portion of a welt is presented to the work support 2 and is marked by the marker 4; and then the upper is turned to present the side of the welt to the work support 1 to be marked by the marker 3, the marking operations taking place separately and in succession.

The work supports 1 and 2 are shown in the drawings as lying in different horizontal planes and with their front extremities in different vertical planes. The purpose of this arrangement will be explained hereinafter.

Since the two work supports with their respective sets of marking mechanism are substantially alike, it will suffice for the present to describe only the work support 1 and its associated marking mechanism.

Referring to Fig. 10, the immediate work sustaining face of the support 1 is supplied by a marking bed 5 which is removable and is retained in place by a counter-sunk screw and a nut extending downwardly and provided with a milled head 6. The counter-sunk portion of the marking bed is duplicated on opposite sides of the bed to provide for ready reversal of the plate when one side becomes worn. The support 1 and its marking bed 5 are stationary, maintaining a constant relation with the marking device 3.

As shown in Fig. 9, the machine bed 5 is embraced by bifurcations 8—8 of the slide plate 9 (see Fig. 10) arranged to be moved horizontally back and forth on the machine by an eccentric 10. At the ends of the bifurcations 8—8 is secured a cross piece 11, which serves as an edge gage against which the upper may be positioned in the manner illustrated in Fig. 4. The marking device 3 as hereinafter described is reciprocated vertically in a fixed path and accordingly, in order to vary the distance between the marking position of the tool 3 and the edge gage, the latter, in the illustrative machine, is arranged to be moved forward or back with the slide plate 9 for the purposes of adjustment. Since, in this connection, relative movement of the tool and edge gage is alone of importance, it follows that the machine could be organized so that either or both of them might be moved for effecting the desired adjustment of their relation. The slide plate 9, which may for convenience be called the gage plate, is adjusted by means of the eccentric 10, pivoted at 12 to the table of the machine and having an arm 13 extending out over a projection of said table (see also Fig. 1). The outer extremity of the arm is in the form of a pointer arranged to traverse, as the arm is moved on the pivot 12, a scale 14 which may be graduated according to any practicable system of sizes or styles. In order that the arm 13 may be held so that its pointer end shall register with any given graduation of the scale 14, the table of the machine is provided with a series of apertures 15 for the reception of a removable plug 16 carried upon a slide block 17 shown in cross section in Fig. 11. As shown in Fig. 9, the relative arrangement of apertures 15 and the graduations of the scale 14 are such that if the plug 16 be introduced to any one of the apertures, the pointer end of the arm 13 will be caused thereby to register with the graduation indicated by the corresponding numeral. With this arrangement the operative may elevate the plug 16 and insert it in one of the apertures 15 with the assurance that such adjustment will cause the eccentric 10 to move the edge gage 11 into the exact relation with the marking device 3 which is desired for making on a welt such a mark as shall determine a sole adjustment appropriate to the size or style of shoe indicated by the particular aperture 15 into which the plug 16 has been introduced.

As shown in Figs. 3 and 8, a marking bed 7 for the marking tool 2, the bifurcations 17, the eccentric 18, the arm 19, the scale 20, the apertures 21 and the plug 26 are formed substantially like the corresponding parts associated with the marking bed 5 for the tool 1. The bifurcations 17 carry an edge gage 27 similar in construction and purpose to the edge gage 11.

Referring to Fig. 7, one marking device is carried at the lower end of a plunger 28 (see also Fig. 4), mounted for vertical movement in a part of the machine frame. The upper extremity of the plunger 28 is internally threaded to engage an adjusting screw 29. When in position the lower end of the screw 29 engages a collar fastened to a cylindrical pin 30 integral with oppositely disposed brackets 31 supplying bearings for a stud-shaft 32. The plunger 28 is depressed to actuate the marking tool through pressure exerted upon the stud shaft 32. This pressure is communicated through the stud shaft, brackets 31, the pin 30 and the screw 29 to the plunger 28. It will be observed that the lower edge of the screw 29 determines the position of the pin 30 with relation to the plunger 28 and consequently if the screw 29 be turned it will adjust the pin in relation to the plunger with the result that the effective length of the plunger, intervening between the stud shaft 32 and the tool, will be increased or decreased as the case may be. This arrangement provides an easy adjustment to compensate for wear of the acting part of the marking tool, or of the marking bed. The parts just described are clearly shown in side elevation in Fig. 4 in which the plunger 28 is shown as carrying the marking tool 3. Rotatably mounted upon the stud shaft 32 is an arm 33 arranged to be rocked on said stud shaft so as to be interposed between the latter and a depressing lever 34 hereinafter described. When the arm 33 is in its operative position (i. e., the position in which it is acted upon by the depressing lever 34), it is substantially vertical and in alinement with the vertical axis of the plunger 28. A spring 35 connecting an ear of the arm 33 with the pin 30 (see Fig. 7) tends to hold the arm 33 normally out of operative position so that if desired the depressing lever 34 may continue its normal movement without effect upon the plunger 28 and marking tool. The plunger 28 is normally upheld by spring 36 attached at one end to a screw plug 37 in the plunger 28, and at its other end to the frame of the machine. Said spring 36 holds the plunger 28 in its uppermost position, determined by a stop 38 against which abuts a part of one of the brackets 31. Thus, when the arm 33 is projected into its operative position, the plunger 28 and the marking tool will partake of the downward movement of the depressing lever 34; and when the latter is again elevated they will be likewise elevated by means of the spring 36 until arrested by the stop 38.

The arm 33 is moved into operative position (against the tension of the spring 35) by means of a bell crank lever 40, pivoted to the frame of the machine, one arm of which bears by a friction roller against the arm 33.

The bell crank lever 40 is rocked on its fulcrum for the purpose of throwing the arm 33 into operative position, indirectly through the agency of a gage 42 which, in the specific illustration, is employed to assist the operator in placing the shoe and holding it in a horizontal position so that corresponding portions of the upper on successive shoes shall be insured their proper engagement with the edge gage 11. In the form shown in Fig. 4, the gage 42 is arranged to abut against the insole of a lasted upper. Said gage is carried at the lower end of a vertically movable gage rod 44 normally depressed beyond its proper gaging position by a spring 46 abutting at its upper end against an ear projecting from the frame of the machine. The normal inactive position of the gage rod 44 is shown in Figs. 2 and 4. When the work is inserted the welt $a$ (Fig. 4) is placed on the work support and the upper $b$ is caused to abut against the edge gage 11, the insole $c$ being at that time in a position oblique to the horizontal. Thus by using substantially the upper edge of the edge gage 11 as a fulcrum (it engaging the welt crease) the upper and insole are rocked into a substantially horizontal position. During the course of this rocking movement, the insole will press against the gage 42 and will elevate it and the gage rod 44 until the latter reaches the uppermost limit of its movement prescribed by an adjustable stop screw 48, against which abuts a part connected with and carried upwardly by the gage rod 44. The uppermost limit of the movement of the gage rod 44 is so adjusted by means of the stop screw 48 that it shall determine a substantially horizontal position for the insole; or, if there be no insole, for the bottom of the last or the like, the object being merely to assure the same general relation, whatever it may be, between successive shoes and the work support and marking means. A collar 50 fixed adjustably upon the gage rod 44, carries a pivot pin 52 to which is connected the lever 54 pivoted at 55 to the frame of the machine and extending toward the right in Fig. 4, to engage and support a vertical latch 56. The outline of this latch may be observed by reference to Fig. 7. The latch 56 is pivoted on a horizontal pivot 57 at the end of the lever 54 and the upper end of the latch is arranged to engage an arm 58 of the bell crank lever 40.

Referring now again to Fig. 4, when the gage 44 is elevated, the lever 54 is thereby rocked clockwise so as to depress the latch 56. As the lever 54 moves, it carries downwardly the arm 58 of the bell crank lever 40, whereby said bell crank is also caused to rock clockwise with the result already explained that the arm 33 is thrown into operative position so that the next descent of the depressing lever 34 shall actuate the marking tool 3. Thus, in the specific machine, whenever the work is introduced to its proper marking position determined by the gages, the actuating mechanism for the marking tool is thrown into operation and a mark is made upon the welt or other part presented on the marking bed, this being the essential of the operation regardless of the particular means employed which, obviously, may be varied.

It is preferred that but a single mark be made at a time,—that is to say, it is preferred that the marking tool be actuated but once for each introduction of the work,—and to this end means are provided for disorganizing the marking-tool actuating-mechanism as soon as a single mark shall have been made. A convenient embodiment of this feature of the invention comprises a releasing finger 60 clearly shown in Figs. 4 and 7. Said finger 60 is mounted upon a non-rotative stud-shaft 32 and is keyed thereto so as to be held rigidly in its vertical position. Thus, when the marker plunger 28 is depressed, the releasing finger 60 is carried downwardly with it. The end of the releasing finger is formed so as partially to encircle the latch 56 (Fig. 7); and, during the downward travel of said finger 60, it engages a releasing cam 62 (Fig. 7) on the latch 56. As the finger 60 moves downwardly it strikes the cam 62 and rocks the latch 56 clockwise in Fig. 7 so that the upper end of the latch is withdrawn from engagement with the arm 58 of the bell crank lever 40— said arm being shown in cross section in engagement with the latch in Fig. 7. This operation of the releasing finger 60 thus liberates the bell crank lever 40 from the control of the latch and leaves the spring 35 (Fig. 4) free to rock the arm 33 out of operative position so as to disorganize the marking tool actuating mechanism. The co-action of the releasing finger 60 and the cam 62 may be so timed that the marker-actuating mechanism will be disorganized at substantially the moment when the marker strikes the work on the marking bed 5; or if desired this may take place at an earlier stage in the descent of the marker. In any case the pressure of the depressing lever 34 on the arm 33 opposing the plunger elevating spring 36, will suffice to hold the marker-actuating mechanism organized until the marking operation has been completed. When, however, the depressing lever 34 ascends and diminishes its pressure on the arm 33, the latter will be rocked to inoperative position by the spring 35. If the operator could be relied upon to remove the shoe and release the gage rod 44 immediately upon the completion of a marking operation it would be less important to provide means for interrupting the communication between said gage rod 44 and the arm 33; but the marking operation being preferably rapid it is impracticable for the operator to withdraw the shoe with sufficient promptness to prevent two or more marking operations taking place in rapid succession. When the releasing finger 60 and the releasing cam 62—or similar expedients—are employed, it is immaterial whether the operator maintain the shoe in marking position or whether he withdraw it; only a single marking operation will occur until the gage rod 44 has descended and thereafter reascended to its gaging position.

After the disorganization of the marker-actuating mechanism, the marker elevating spring 36 lifts the plunger 28 and thereby withdraws the releasing finger 60 so that the latch 56 is then free to rock contra-clockwise in Fig. 7 under the influence of its spring 64. After the latch was disengaged from the arm 58 of the bell crank lever 40 (by the descent of the releasing finger 60) said arm 58 was permitted to rock to a position elevated slightly above that in which the arm is shown in Fig. 7; and consequently when the latch 56 is free to rock contra-clockwise in Fig. 7, the arm 58 is no longer in position to be engaged by the latch and the extreme end of the latch will strike against said arm 58 and be detained by it. It should be borne in mind that the latch 56 is supported and carried by the end of the gage rod lever 54 (Fig. 4). It follows, therefore (the latch 56 and bell crank lever arm 58 being disengaged as just described) that when removal of the work permits the spring 46 to rock the gage rod lever 54, the latch 56 will be elevated so that its latching portion will pass above the bell crank lever arm 58, whereupon the spring 64 will bring the latch into operative relation with the arm 58 as shown in Fig. 7. Thus, whenever the work is properly introduced to the machine one marking operation will ensue, and thereupon the marker actuating mechanism will be definitely disorganized and will remain so. When the work is partially or entirely withdrawn, the mechanism so re-adjusts itself as to provide for effecting another marking operation upon the next introduction of work to its proper position.

The marker actuating devices, etc. to coöperate with the marking bed 7 are, for convenience, substantially like those already described as coöperating with the marking bed 5; and accordingly, the same reference characters are applied in the drawings to the former, which have been used in describing the latter. It will be observed (Figs. 1 and 3) that the marker plungers 28—28 are positioned as close together as is practicable with their respective sets of gage adjusting devices, latches, and latch releasing devices oppositely disposed on their remote (as distinguished from adjacent) sides. This arrangement permits an operator to move a shoe from one set of marking devices to the other by a slight shift through a short distance only.

Referring now to Figs. 1 and 2, the respective depressing levers 34—34 are supplied upon a unitary walking-beam 70, pivoted at 72 to the machine frame and connected by a rod 74 with a strap encircling an eccentric on the power shaft 76 of the machine. Preferably the shaft 76 is provided with fast and loose pulleys to which a belt 78 may be introduced alternately by a shipper lever 80 shown in Figs. 1 and 2. Preferably, during the employment of the machine the shaft 76 is driven continuously and thereby the walking-beam 70 is continuously rocked carrying with it the respective depressing levers 34—34. The latter are not effectively operative, however, except when work is introduced as already described.

A form of marking tool convenient to be employed in a machine such as is shown in the drawings, is disclosed in Fig. 14, which illustrates a notching cutter for making a rectangular notch in the edge of a welt or the like. When any sort of a marking tool is employed, which cuts or otherwise removes particles of material or chips, it is considered expedient to employ devices for removing the chips from the cutting beds of the machine. Brushes 82, 82 shown in Figs. 1, 7 and 8, exemplify a convenient means for removing chips or the like as contemplated by this invention.

Referring to Fig. 8, each brush 82 is mounted on a brush lever 84 pivoted at 86 to a stationary part of the machine frame and arranged to be rocked on said pivot so as to pass partially or completely over the cutting beds 5 and 7, and to brush off any chips or the like. One brush lever 84 (on the right Fig. 8) is connected by a link 88 with a second brush lever 90 pivoted at 92 to a stationary bracket on the frame and having a toe 94 (see Fig. 7) arranged to be engaged by the bifurcated lower end of a brush actuating arm 96 pivoted at 97 on the machine frame (see also Fig. 6). The arm 96 has integral with it a sector gear 98 meshing with a rack 99. This rack 99 is fixed rigidly upon the stud-shaft 32 and travels vertically with the plunger 8 on the left of Figs. 7 and 8. When said plunger descends to mark, the rack 99 rocks the arm 96 contra-clockwise in Fig. 6 and said arm rocks the toe 94 in the direction of the arrow (Fig. 8) with the result that the brush 82 (Fig. 8) wipes across the cutting bed 5. In like manner to that just described, a rack 100 is arranged on the right-hand plunger in Fig. 7, for rocking an arm 102 (Fig. 8) and thereby rocking a toe 104. The movement of said toe 104 is communicated to the left-hand brush 82 (Fig. 8) through the lever 105 and link 106 with the result that when the right-hand plunger in Fig. 7 makes its descent, the left-hand brush wipes across the cutting bed 7.

It will be observed that upon the descent of a marking plunger at one side of the machine the brush at the other side of the machine clears away any chips which may rest upon its adjacent marking bed; and vice versa the means to this end being capable of modification and variation within the scope of the present invention. It is also true that when either marking plunger descends the brush for this marking bed is entirely removed from any position in which it could interfere with the proper positioning of the work or with the marking operation.

It is frequently desired that a sole shall have a greater extension beyond an upper at one point than at another; for example, it may be desired that the outer lateral forepart edge shall project to a considerably greater distance beyond the upper than at the toe. To meet such preferences as these, it is convenient to adjust one edge gage, as 27, to suit the mark desired for a toe extension; and to adjust the other gage 11 to suit the extension desired for the lateral forepart edge. These adjustments may, if desired, be maintained through a number of shoes in succession. It is convenient, under these circumstances first to introduce the toe to the edge gage 27 to receive a mark; and then to introduce the forepart edge of the same shoe to the edge gage 11 to receive one or more additional marks.

It will be noted in Figs. 2 and 7 that the work support 2 is elevated somewhat above the work support 1; and it will also be noted, in Fig. 2, that the latter projects from the front of the machine a considerable distance beyond the former. One purpose of this arrangement may be readily understood by reference to the diagrammatic views in Figs. 12 and 13. The inner work support 2 is preferred to be used in marking the toe portion of a welt or the like, and this support is readily accessible to the toe. This leaves the other support 1 to be used for marking the side portion of the welt or the like. If the front extremities of the work supports 1 and 2 were arranged in the same vertical plane, instead of being disposed as shown in Fig. 12, the work support 2 or its edge gage might seriously obstruct the manipulation of the shoe when it is placed in the position indicated by the dotted lines $x$, usually adopted for marking right shoes, or more especially, when a shoe is presented in the position indicated by the dotted lines $y$, in which the heel portion of the upper might be quite precluded from assuming its proper position. In like manner, if the work supports 1 and 2 lay in the same horizontal plane instead of being disposed one higher than the other as shown in Fig. 13, a shoe introduced to the support 1 in either of the positions $x$ and $y$ shown in Fig. 12, would be very likely to strike against the gage, or gage rod 44, which coöperates with the said support 2. This interference with the gage might obstruct proper positioning of the shoe or it might, by moving the gage, result in starting an undesired operation of the marker for the support 2 with the result that the brush for the latter might be broken, or some accidentally introduced part of the shoe might be marked or mutilated. Hence the described arrangement shown is not in itself indispensable; but it may be varied in any practicable manner so long as it shall supply the purposes for which it is intended.

The character of the above described machine is of great and important advantage in that it permits the rapid marking of different parts of a welt or the like at different distances from an upper without necessitating any change of adjustment so long as it is desired to maintain a uniform style throughout a series of shoes. That is to say, whatever differences there may be in the desired extension of sole at different parts of a shoe, the gaging means of the machine will be set respectively to give the desired variations in sole extension; and thereafter the marking may be proceeded with by simply introducing to each marker in succession the appropriate part of the welt or the like, to be marked in the manner and according to the style determined by the adjustment of the gage immediately associated with said marker.

During the course of the preceding description it has been convenient to employ various terms denoting direction of movement, position, and the like; but it is to be understood that these terms are not expressive of any characteristic features of the invention, but are used merely to facilitate explanation.

In describing the illustrative embodiment of this invention shown in the drawings, it has been assumed for convenience that the marks to which the adjustment of sole leather is to be referred are to be applied to the welt of a welted upper. Evidently, however, the marks might be applied to uppers which are not welted, as, for example, to uppers having their edges out-turned preparatory to making stitch-down shoes. For convenience, therefore, the expression "upper-portion" will be employed in the sub-joined claims to indicate any portion of an upper to which in practice a sole adjusting mark might be applied.

I do not herein claim broadly means for marking or notching a welt or an upper portion of a shoe, nor the method of so doing, as such broad subject-matter is not of my invention, but

What I claim is:—

1. In a machine for marking the extension edge of a shoe, the combination of a marking tool, an edge gage for determining the position of the mark to be made thereby with reference to the shoe contour, a second gage for determining the position of the work with respect to the edge gage, and means rendered operative by movement of one of said gages to cause the tool to act.

2. In a machine for marking the projecting edge of a shoe to determine the position of the outsole, the combination of a marking tool, an edge gage for determining the position of the mark with respect to the shoe contour, a second gage for determining the position of the shoe with respect to the edge gage, and means rendered operative by movement of said second gage to cause the tool to act.

3. In a machine of the class described, the combination of a marking knife for cutting a notch in the extension edge of a shoe, an adjustable edge gage for determining the location of a wall of said notch with respect to the shoe contour, a second gage acting upon the surface of the work to position the shoe with respect to the edge gage, and means rendered operative for giving movement to the knife upon movement of said second gage.

4. In a machine of the class described, the combination of a knife substantially U-shaped in cross-section for making a notch in the extension edge of a shoe, an edge gage for determining the position of said notch with respect to the shoe contour, and means independent of said edge gage for rendering the knife operative as the shoe is put in position.

5. In a machine for notching the extension edge of a shoe, the combination of a plunger carrying a notching tool, means for operating the plunger, a marking bed, an edge gage constructed and arranged with respect to the marking bed to engage and position a shoe for determining the location of the notch with respect to the shoe contour, and means for adjusting the edge gage toward and from the marking bed and holding the same in adjusted position.

6. The combination of a marking device for marking an upper-portion to facilitate adjustment of sole leather to the upper; an edge gage for determining the location of the mark with respect to the shoe contour, work-positioning means arranged to contact with the insole and to be moved thereby as the shoe is properly presented to the action of the marking device, thereby to initiate the operation of the marking device; and means to render the work-positioning means ineffective as to its capacity to initiate further operations of the marking means.

7. The combination of a marking device for marking an upper-portion to facilitate adjustment of sole leather to the upper; a work support and edge gage over which the work to be marked is laid; and work-positioning means independent of its edge gage arranged to contact with the insole and to be moved thereby as the shoe is properly presented to the action of the marking device, and means controlled thereby to initiate the operation of the marking device.

8. In a marking machine, a work support, a gage 42 for determining the position of the work with respect thereto, a plunger carrying a knife for cutting a notch in the extension edge of the upper portion of a shoe, an actuator 34, an arm 33 connected to the plunger, a lever 40 for moving arm 33 into the path of the actuator 34, and means controlled by the gage 42 for moving the lever 40 and arm 33.

9. In a marking machine, a work support, an edge gage, a gage 42 for determining the position of the work with respect thereto, a tool carrier, an actuator 34 for said carrier, an arm connected to said carrier and movable into and out of the path of said actuator, means under control of the gage 42 for positively moving said arm into the path of the actuator as the work is put in position for treatment.

10. In a marking machine, a work support, a gage by which to position the work with respect thereto, a tool carrier, an actuator 34, an arm 33 connected to the tool carrier, a lever 40 for moving said arm into the path of the actuator, a latch movable with the gage and acting upon lever 40 to throw the arm 33 into the path of the actuator as the gage is moved.

11. In a marking machine, a work support, a gage by which to position the work with respect thereto, a tool carrier, an actuator 34, an arm connected to the carrier, a lever for moving the arm into the path of the actuator, a latch movable with the gage to throw the said arm into the path of the actuator, and a finger movable with the carrier for tripping the latch.

12. The combination of a tool; actuating means therefor; a plurality of work-positioning means, one of which determines the position of the work with respect to the shoe contour, and mechanism under control of the work positioning means whereby the actuating means is rendered active when the work is properly positioned in a plurality of directions as provided for by the work-positioning means.

13. The combination of a pair of marking devices for marking an upper-portion to facilitate adjustment of sole leather to the upper; and means operable upon actuation of one of said devices to remove a chip from the path of the other.

14. The combination of alternatively operating marking devices; marking beds; chip-removing means for said devices respectively; and means to operate said respective chip-removing means in inverse sequence to the operation of the marking devices.

15. The combination of a plurality of marking devices for marking an upper-portion to facilitate adjustment of sole leather to the upper; work-positioning means for said devices; common means for said devices, an element connected to each of said marking devices and normally out of operative position with respect to the operating means, and means under control of the work for selectively moving said elements into the path of movement of the operating means.

16. In a machine for marking the extension edge of a shoe, the combination of a plunger carrying a marking tool, a marking bed 5, and edge gage 11 extending in front of the marking bed to determine the position of the mark to be made with respect to the shoe contour, a gage plate connected to said edge gage, and means to adjust and hold the gage plate to position the edge gage with respect to the marking bed.

In testimony whereof, I have signed my name to this specification, in the presence of two subscribing witnesses.

GEORGE F. STEWART.

Witnesses:
 LAWRENCE A. JARNEY,
 FREDERICK L. EMERY.